Patented Nov. 2, 1943

2,333,402

UNITED STATES PATENT OFFICE 2,333,402

ACID WOOL DYESTUFFS OF THE ANTHRAQUINONE SERIES

Alexander J. Wuertz, Wilmington, Del., Henry R. Lee, Pitman, N. J., and Edwin C. Buxbaum, Swarthmore, Pa., assignors to E. I. du Pont de Nemours & Company, Wilmington, Del., a corporation of Delaware No Drawing. Application May 31, 1940, Serial No. 338,223

5 Claims. (Cl. 260—374)

This invention relates to the preparation of new acid wool dyestuffs of the anthraquinone series and more particularly to the preparation of acid wool dyestuffs of the anthraquinone series which carry flourine attached through an arylamino radical to the anthraquinone nucleus.

The arylamino-anthraquinone sulfonic acids constitute a well known class of acid wool dyestuffs. Two general types of this general class of dyestuffs are known. One being those in which the sulfonic acid group is attached through an aryl-amino or aryloxy-group to the anthraquinone nucleus and the other in which the sulfonic acid group is attached directly to the anthraquinone nucleus usually in a beta position. The two types of dyestuffs have somewhat different dyeing characteristics although these characteristics may be materially modified by the introduction of other substituents in the molecule.

In general the introduction of halogen such as chlorine and bromine in the aryl groups of the bases of these acid wool dyestuffs render the compounds of little value since the resulting acid wool colors are usually dull and, in the main, it is difficult to introduce a sulfonic acid group in the aryl radical when chlorine or bromine is present. Since it has been impossible to condense a primary arylamine containing chlorine or bromine attached to a side chain such as trichloromethyl- or tribromomethyl-aniline (aminobenzotrichloride or aminobenzotribromine) with halogen anthraquinones, dyestuffs of the anthraquinone acid wool series containing such halogen have not been produced.

We have found that desirable acid wool dyestuffs which exhibit improved washing fastness and level dyeing properties can be produced by the introduction of fluorine into the aryl radical of the aryl amino-anthraquinone acid wool dyestuffs in the form of trifluoromethane groups. The colors obtained vary quite markedly in shade from the dyestuffs of similar formula but which do not contain the trifluoromethyl radical. This invention is of particular importance because the production of new shades in this class of dyestuffs has been found to be imperative in meeting the new demands for colors for dyeing wool, silk, nylon, and similar fibers, and the introduction of the trifluoromethyl radical in the arylamino-anthraquinone acid wool dyestuff class materially enlarges the range of colors that are available for those fibers in this very desirable class of acid wool dyestuffs.

It is therefore an object of this invention to prepare acid wool dyestuffs in new and desirable shades and which exhibit improved fastness and level dyeing properties.

According to the present invention the fluorine-containing acid wool dyestuffs may be prepared by condensing amino halogen anthraquinones and hydroxy halogen anthraquinones with arylamines of the benzene series which carry directly attached to the aryl ring a trifluoromethyl radical. The condensation may be carried out by any of the well known methods employed for condensing aryl amines with halogen anthraquinones. The resulting base is then sulfonated in the usual manner to render the product water soluble. These compounds have the general formula:

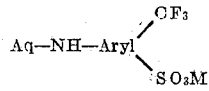

in which Aq stands for an anthraquonine molecule, Aryl stands for an aryl radical of the benzene series and M stands for an alkali metal. These new fluorine containing acid wool dyestuffs dye wool, silk, nylon and similar fibers in desirable shades which exhibit increased fastness and level dyeing properties. The trifluoromethyl aniline employed may be unsubstituted or it may contain further substituents such as nitro-hydroxy, alkoxy, sulfo, or mercapto groups which are often introduced to vary the shade of the dyestuffs. The halogen anthraquinone to which the trifluoromethyl aniline is condensed may also carry further substituents of the type often introduced to modify the dye characteristics of the resulting shade of the product. In all cases the introduction of the trifluoromethyl group in the aryl ring materially alters the shade of the dyestuff and in general improves its dyeing properties.

The condensation of the halogen anthraquinones with the trifluoro aniline compounds may be effected by any of the usual condensation methods such as in the presence of water, ammonium acetate, and a copper catalyst or by the "dry" condensation method using an excess of the arylamine with anhydrous sodium or potassium acetate or in organic solvents such as nitrobenzene, orthodichlorobenzene, dioxan, etc.

The following examples are given to illustrate the invention. The parts used are by weight:

*Example 1*

Eight parts of 1-amino-2:4-dibromo-anthraquinone, 30 parts of meta-amino-benzo-trifluoride, eight parts of ammonium acetate, 22 parts of water and one-half part of copper acetate, are reacted by refluxing gently for eight hours. The mass is then cooled and diluted with sufficient alcohol to precipitate the color base, 1-amino-2-bromo - 4 - (3'-trifluoromethyl-anilino)-anthraquinone, in the form of violet-blue crystals.

Five parts of the color base are slowly dissolved in 100 parts of monohydrate and agitated until complete sulfonation is obtained. The dyestuff is then isolated by pouring out into ice and water and filtering off the free acid. This is washed acid free with brine and dried. The dyestuff so obtained in the form of its alkali metal salt, dyes wool in bright red-violet shades of good dyeing properties.

Example 2

Fifty parts of 1-amino-2-methyl-4-bromo-anthraquinone, 200 parts of meta-amino-benzotrifluoride, 50 parts of ammonium acetate, 300 parts of water and one part of copper acetate, are reacted by refluxing for ten hours at 100–105° C. The mass is then cooled and diluted with ethyl alcohol. The diluted crystalline mass is then filtered off, washed with alcohol, hot water and dried. The dyestuff base, 1-amino-2-methyl-4(m-trifluoromethyl anilino)-anthraquinone is obtained in large blue-black crystals.

This color base is dissolved in sulfuric acid monohydrate and sufficient oleum added to sulfonate the base in the usual manner to render it completely soluble in water. The sulfonated color is isolated in the usual manner. It dyes wool in reddish-blue shades exhibiting good dyeing properties.

Example 3

Nineteen parts of 1-hydroxy-2:4-dibromo-anthraquinone are reacted with 80 parts of meta-amino-benzo-trifluoride, 20 parts of ammonium acetate, 60 parts of water and one-half part of copper acetate. The reaction mass is heated to 100–110° C. for a period of 16–24 hours or until condensation is complete. The mass is then cooled, diluted with alcohol, filtered and dried. It is essentially 1-hydroxy-2-bromo-4-(3'-trifluoromethylanilino)-anthraquinone.

When sulfonated and isolated in the usual manner, a very bright violet dyestuff is obtained which dyes wool in bright violet shades and exhibits good fastness to washing and fulling.

Example 4

Eight parts of 4-bromo-1:9-N-methyl-anthrapyridone, 30 parts of meta-amino-benzo-trifluoride, eight parts of ammonium acetate, 22 parts of water and one-half part of copper acetate are refluxed at 100–105° C. The base separates out in red crystals which are isolated by dilution with alcohol followed by filtration. The base is then washed with alcohol, hot water and dried.

Five parts of the base as obtained above are dissolved in 100 parts of sulfuric acid monohydrate and agitated at room temperature until sulfonation is complete. The color is then isolated by pouring out into a mixture of ice and water, filtering off the precipitated free acid of the dyestuff and washing with brine until acid free.

The dyestuff so obtained dyes wool in red shades much yellower than the corresponding para-toluidine condensation (Alizarine Rubinol R).

Example 5

Eight parts of 1-methylamino-4-bromo-anthraquinone, 30 parts of meta-amino-benzo-trifluoride, eight parts of ammonium acetate, twenty-two parts of water, and one-half part of copper acetate are refluxed gently at 100–105° C. for 20 hours. The color gradually changes to violet and then blue. When condensation is complete, the mixture is diluted with 50 parts of alcohol, and the product which is precipitated out is filtered off, washed with additional alcohol and hot water. It is obtained in the form of a bronzy blue powder.

When sulfonated in the usual manner, with sulfuric acid monohydrate and oleum, a blue dyestuff is obtained. It dyes wool in level blue shades of good dyeing properties.

In the above example 1-amino-4-bromo-anthraquinone may be substituted for the 1-methylamino-4-bromo-anthraquinone in which case the resulting sulfonic acid derivative dyes in a redder shade of blue than the 1-methylamino derivative.

In the preparation of the amino-benzotrifluoride a mixture of the respective ortho, meta and para- isomers are obtained. This commercial mixture or the isolated ortho or para-isomers may be used in place of the meta isomer employed in the examples.

We claim:

1. Acid wool dyes of the phenylaminoanthraquinone sulfonic acid class which carry the group —CF$_3$ directly attached to the phenyl ring and which carry a sulfonic acid group in said phenyl ring.

2. 1-amino-4-phenylaminoanthraquinone sulfonic acid which carries a group —CF$_3$ directly attached to the phenyl ring and which also carries the sulfonic acid group in said phenyl ring.

3. 1-methylamino-4-m-trifluoromethyl - anilinoanthraquinone sulfonic acid in which the sulfonic acid group is in the anilino ring.

4. 1-amino-2-methyl-4-m-trifluoromethyl-anilinoanthraquinone sulfonic acid in which the sulfonic acid group is in the anilino ring.

5. 1-hydroxy-2-bromo-4-m - trifluoromethyl - anilinoanthraquinone sulfonic acid in which the sulfonic acid group is in the anilino ring.

ALEXANDER J. WUERTZ.
HENRY R. LEE.
EDWIN C. BUXBAUM.